United States Patent
Meyer

[19] [11] 3,795,286
[45] Mar. 5, 1974

[54] APPARATUS AND MEANS FOR INDUCING VIBRATIONS IN AN EARTH FORMATION

[75] Inventor: Herbert J. Meyer, Houston, Tex.
[73] Assignee: Texaco, Inc., New York, N.Y.
[22] Filed: Feb. 23, 1972
[21] Appl. No.: 228,516

[52] U.S. Cl...... 181/.5 RC, 340/15.5 GC, 181/.5 H, 73/75.5
[51] Int. Cl. .......................... G01v 1/22, G01v 1/14
[58] Field of Search........ 340/15.5 R, .5 TD, .5 GC; 181/.5 EC, .5 H; 73/71.5, 71.6; 328/154

[56] References Cited
UNITED STATES PATENTS

| | | | |
|---|---|---|---|
| 3,698,508 | 10/1972 | Landrum, Jr. ..................... | 181/.5 EC |
| 3,219,971 | 11/1965 | Cole ............................... | 340/15.5 R |
| 3,516,510 | 6/1970 | Coburn et al. .................... | 181/.5 |
| 2,867,723 | 1/1959 | Spaulding .......................... | 328/154 |
| 3,217,184 | 11/1965 | Lach ................................ | 328/154 X |
| 3,610,950 | 10/1971 | Keller et al. ...................... | 328/154 X |

FOREIGN PATENTS OR APPLICATIONS 1,033,705   6/1966   Great Britain...................... 73/71.5

*Primary Examiner*—Maynard R. Wilbur
*Assistant Examiner*—N. Moskowitz
*Attorney, Agent, or Firm*—Thomas H. Whaley; C. G. Ries

[57] ABSTRACT

Vibrator apparatus induces vibrations in an earth formation so that the nature of the earth formation can be determined from its effect on the induced vibrations. A sine wave voltage is provided having a variable frequency sweep. The voltage is phase shifted and summed with feedback signals. The sum signal is then used to control a torque motor. The motor controls a hydraulic valve which provides a hydraulic output to a cylinder to control the movement of a pad against the earth's formation. The hydraulic valve and the cylinder movements are monitored by a transducer in the form of a linear differential voltage transformer to provide feedback signals. An accelerometer mounted on the pad provides a signal corresponding to the acceleration and de-acceleration of the pad. A threshold detector receiving the signal from the accelerometer controls an electronic switch to pass the accelerometer's signal for use in controlling the shifting of the phase of the sine wave voltage when the amplitude of the accelerometer signal is equal to or greater than a predetermined amplitude. When the amplitude of the accelerometer's signal is less than the predetermined amplitude, the threshold detector controls the electronic switch to pass the feedback signal corresponding to the cylinder movement to be used in shifting the phase of the sine wave voltage.

1 Claim, 1 Drawing Figure

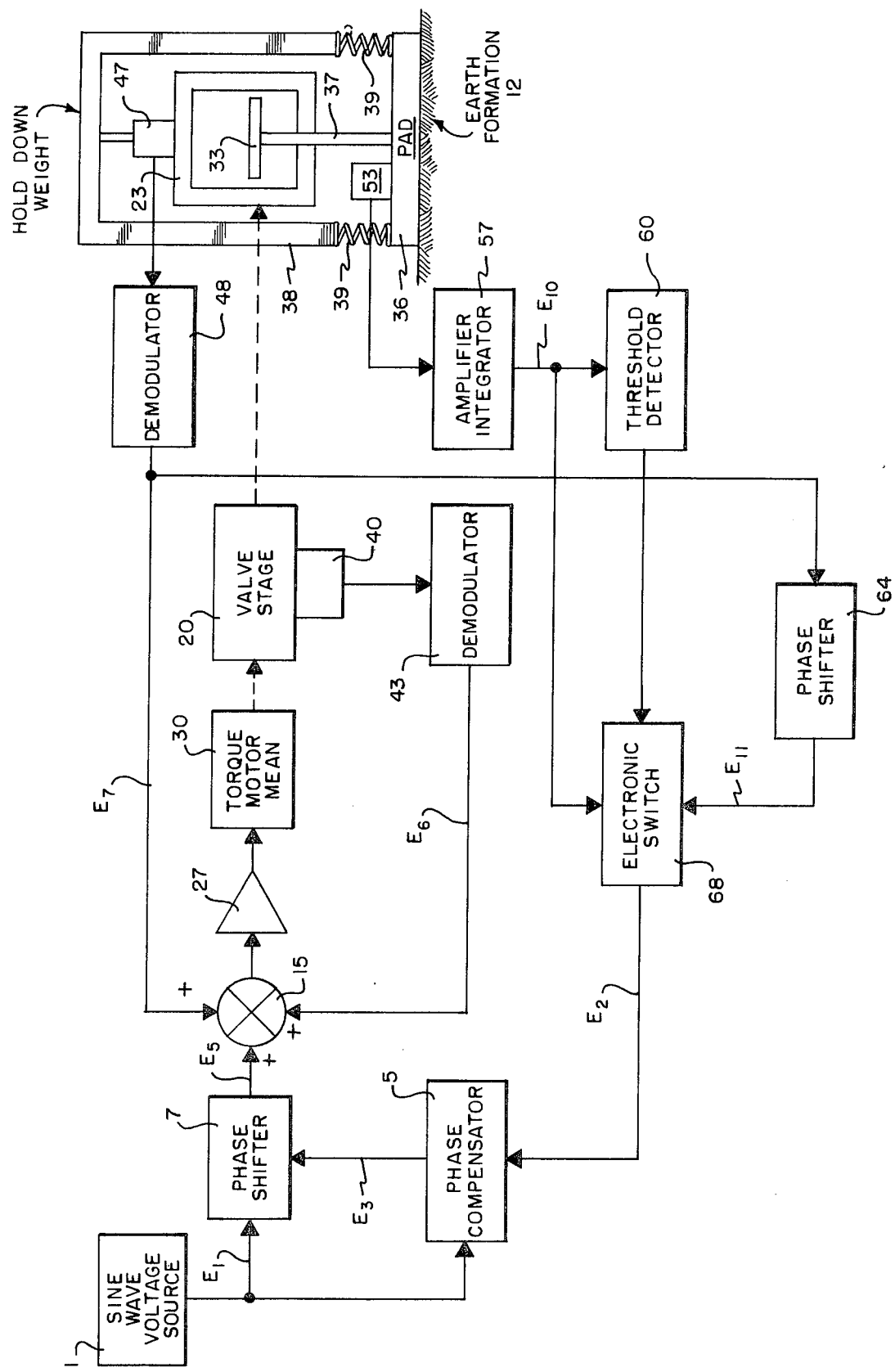

APPARATUS AND MEANS FOR INDUCING VIBRATIONS IN AN EARTH FORMATION

BACKGROUND OF THE INVENTION

Field of the Invention

The present invention relates to seismic apparatus and methods in general and, more particularly, to vibrator apparatus and methods.

SUMMARY OF THE INVENTION

Vibrator equipment induces vibrations in an earth formation. The equipment includes a source which provides a sine wave voltage of a variable frequency. The frequency of the voltage is varied in a predetermined manner. A phase shifting circuit shifts the phase of the voltage in accordance with a phase correction signal. Apparatus induces the vibrations in accordance with the phase corrected voltage. The apparatus includes a device which moves a pad held in contact with the earth, in accordance with the phase corrected voltage so that the pad moves the earth's formation to induce the vibrations in the earth's formation. A signal source connected to the device provides a first signal corresponding to the movement of the pad. A second signal source connected to the pad provides a second signal corresponding to the movement of the pad. A second phase shifter changes the phase of the first movement signal so that the phase of the first movement signal is substantially the same as the second movement signal. A switching network connected to the first and second phase shifters and to the second signal source provides the second movement signal to the first phase shifter as the phase correction signal when the amplitude of the second movement signal is equal to or greater than a predetermined amplitude while blocking the signal from the second phase shifter and providing a signal from the second phase shifter to the first phase shifter as the phase correction signal when the amplitude of the second movement signal is less than the predetermined amplitude while blocking the second movement signal.

The objects and advantages of the invention will appear more fully hereinafter in consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

DESCRIPTION OF THE DRAWING

The FIGURE is a simplified block diagram of apparatus, constructed in accordance with the present invention, for inducing vibrations in an earth formation.

DESCRIPTION OF THE INVENTION

Presently, vibrator apparatus induce vibrations in an earth formation so that the nature of the earth formation can be determined from its effect on the induced vibrations. Referring to the FIGURE, a source 1 provides a sine wave voltage $E_1$ at a variable frequency to a phase compensator 5, as a reference voltage, and to a phase shifter 7.

Phase compensator 5 compares voltage $E_1$ with a signal $E_2$ relating to vibrations being induced in an earth formation 12, as hereinafter described, and provides a correction signal $E_3$ to phase shifter 7. Phase shifter 7 adjusts the phase of voltage $E_1$ in accordance with signal $E_3$ to provide a phase corrected signal $E_5$ to summing means 15 where it is summed with feedback signals $E_6$, $E_7$ corresponding to the operation of a hydraulic valve stage 20 and a cylinder stage 23, respectively, as hereinafter explained.

A sum signal from summing means 15 is amplified by a conventional type amplifier 27 so that it may drive torque motor means 30. Torque motor means 30 provides a hydraulic signal to valve stage 20 which in effect amplifies the hydraulic signal.

The output of valve stage 20 is applied to cylinder stage 23 which drives a piston 33 inside of cylinder stage 23. Piston 33 is connected to a pad 36 by a shaft 37. The output of valve stage 20 moves cylinder 23, piston head 33, pad 36 and shaft 37 so that pad 36 causes vibrations in the earth formation 12 at a frequency corresponding to the frequency and phase of voltage $E_1$. Pad 36 is held in contact with the earth formation 12 by a hold down weight 38, which by way of example may be a truck, and springs 39. Hold down weight 38 does not act as a load on the pad 36 motion. The vibrations are monitored by seismic recording equipment (not shown). In processing the recorded vibrations, it is important that the vibrations be induced in the earth formation 12 through a known range of frequencies. Thus, it is important that the frequency sweep of the induced vibration follow the sweep of voltage $E_1$ in frequency and phase.

A linear differential voltage transformer 40 senses the motion of valve 20 and provides a signal having a complex frequency which includes a carrier frequency and a signal frequency. A demodulator 43 demodulates the signal from transducer 40 to provide signal $E_6$ having the signal frequency of the signal from transformer 40. The frequency of signal $E_6$ corresponds to the motion of valve stage 20.

A linear differential voltage transformer 47, mounted on cylinder 23 and mechanically connected to hold down weight 38, senses the motion of cylinder 23 to provide a signal having a carrier frequency and a signal frequency. The signal from linear different voltage transformer 47 is demodulated by a demodulator 48 to provide signal $E_7$ having the signal frequency which corresponds to the frequency of cylinder 23 movement. The summing of signals $E_5$, $E_6$ and $E_7$ achieves a uniformity of frequency between the known frequency of voltage $V_1$ and the frequency of the output of valve stage 20 and the frequency of the movement of cylinder 23.

To correct for phasing, an accelerometer 53 mounted on pad 36 provides a signal corresponding to the acceleration and de-acceleration of movement of pad 36. The signal from accelerometer 53 is amplified and integrated by an amplifier integrator 57 to provide a signal $E_{10}$ corresponding to pad 36 acceleration and de-acceleration.

The electronic portion heretofore described may be purchased from the Electro-Technical Division of Mandrel Industries Incorporated under their part number SHV-200 while the vibrator portion which includes torque motor 30, valve stage 20 and cylinder 23, piston 33, pad 36 and shaft 37 may be purchased from Wabco under their part number Y-1100-C. Previously signal $E_{10}$ was used directly in lieu of signal $E_2$ to correct the phase of voltage $E_1$.

In operation, the operator varies the frequency of voltage $E_1$ in a predetermined manner. The operator may sweep up, which is to say he may increase the frequency from low frequency to high frequency over a predetermined time interval or he may sweep down. During the sweep-down operation, the operator decreases the frequency of voltage $E_1$ from high frequency to low frequency.

A serious problem is encountered in the sweep-up operation in which the first several cycles of voltage $E_1$ is not followed by pad 36 and the signal from accelerometer 53 cannot cause phase correction. Although this problem has been in existence for years, the solution has not been heretofore determined.

The concept of the present invention is to utilize the cylinder feedback signal $E_7$ as a phase correction signal when signal $E_{10}$ cannot be used as a phase correction signal. A threshold detector 60, which may be of a conventional type, determines if signal $E_{10}$ is of a sufficient amplitude to be used as a phase correction signal. When signal $E_{10}$ is of sufficient amplitude, detector 60 provides a direct current output at a high level. When signal $E_{10}$ is not of a sufficient amplitude, the output provided by detector 60 is at a low level.

Cylinder feedback signal $E_7$ is phase shifted a predetermined amount by a phase shifter 64, to account for a known phase difference between signal $E_6$ and signal $E_{10}$, to provide signal $E_{11}$. Thus signal $E_{11}$ has substantially the same phase as signal $E_{10}$. Signals $E_{10}$, $E_{11}$ are applied to an electronic switch 68. Switch 68 is controlled by a high level output from detector 60 to provide signal $E_{10}$ as signal $E_2$ while blocking signal $E_{11}$. Thus, signal $E_{10}$ is used as the phase correction signal when signal $E_{10}$ is of sufficient amplitude. Switch 60 provides signal $E_{11}$ as signal $E_2$, while blocking signal $E_{10}$, when the output from detector 60 is at a low level. Thus, signal $E_7$, after being made to have substantially the same phase as signal $E_{10}$, is used as a phase correction signal when signal $E_{10}$ is not of sufficient amplitude.

The apparatus and method of the present invention as heretofore described uses a feedback signal, related to movement of a cylinder, as a phase correction signal for shifting the phase of a sine wave voltage when the amplitude of a signal from an accelerometer mounted on a pad is less than a predetermined amplitude and uses the accelerometer signal as the phase correction signal when the accelerometer signal is equal to or greater than the predetermined amplitude. The apparatus and method also provides for the correction and phase of the cylinder feedback signal so that it has substantially the same phase as the phase of the accelerometer signal.

We claim:

1. A method for inducing vibrations in an earth's formation which comprises the following steps: providing a control signal of a variable frequency and phase, changing the frequency of the control signal in a predetermined manner, changing the phase of the control signal in accordance with a sum signal, sensing the movement of the pad and providing a signal corresponding thereto, summing the movement signal with the control signal to provide the sum signal, sensing the acceleration and de-acceleration of the pad and providing a signal representative thereof, the improvement comprising shifting the phase of the movement signal so that the movement signal has substantially the same phase as the acceleration/deacceleration signal, providing the acceleration/de-acceleration signal as the phase correction signal when the amplitude of the acceleration/de-acceleration signal is equal to or greater than a predetermined amplitude; and providing the phase shifted movement signal as the phase correction signal when the acceleration/de-acceleration signal is less than the predetermined amplitude.

* * * * *